United States Patent [19]

Horton

[11] 4,160,161

[45] Jul. 3, 1979

[54] LIQUID CHROMATOGRAPH/MASS SPECTROMETER INTERFACE

[75] Inventor: Robert L. Horton, Bartlesville, Okla.

[73] Assignee: Phillips Petroleum Company, Bartlesville, Okla.

[21] Appl. No.: 910,728

[22] Filed: May 30, 1978

[51] Int. Cl.² .............................................. B01D 59/44

[52] U.S. Cl. .................................... 250/281; 250/283; 250/423 R

[58] Field of Search ............... 250/281, 286, 282, 283, 250/423 R

[56] References Cited

U.S. PATENT DOCUMENTS

| | | | |
|---|---|---|---|
| 3,742,213 | 6/1973 | Cohen et al. | 250/282 |
| 4,023,398 | 5/1977 | French et al. | 250/281 |
| 4,121,099 | 10/1978 | French et al. | 250/281 |

OTHER PUBLICATIONS

"Molecular Beams of Macroions" by Dole et al., Journal of Chemical Physics, vol. 49, No. 5, Sep. 1, 1968.

*Primary Examiner*—Harold A. Dixon

[57] ABSTRACT

Method and apparatus for interfacing a liquid chromatograph column and a mass spectrometer. The ions necessary for analysis by a mass spectrometer are provided by utilizing a conduit held at a high voltage potential to ionize at least a portion of the solute flowing out of the liquid chromatograph column. Chambers held at low pressure are utilized to evaporate substantially all of the un-ionized solvent present with the solute to provide an ion stream consisting essentially of ionized solvent and solute to the mass spectrometer. The mass of the ionized solute is then determined by the mass spectrometer, thus providing an analysis of the components eluted from the liquid chromatograph column.

40 Claims, 3 Drawing Figures

LIQUID CHROMATOGRAPH/MASS SPECTROMETER INTERFACE

Figure 1:
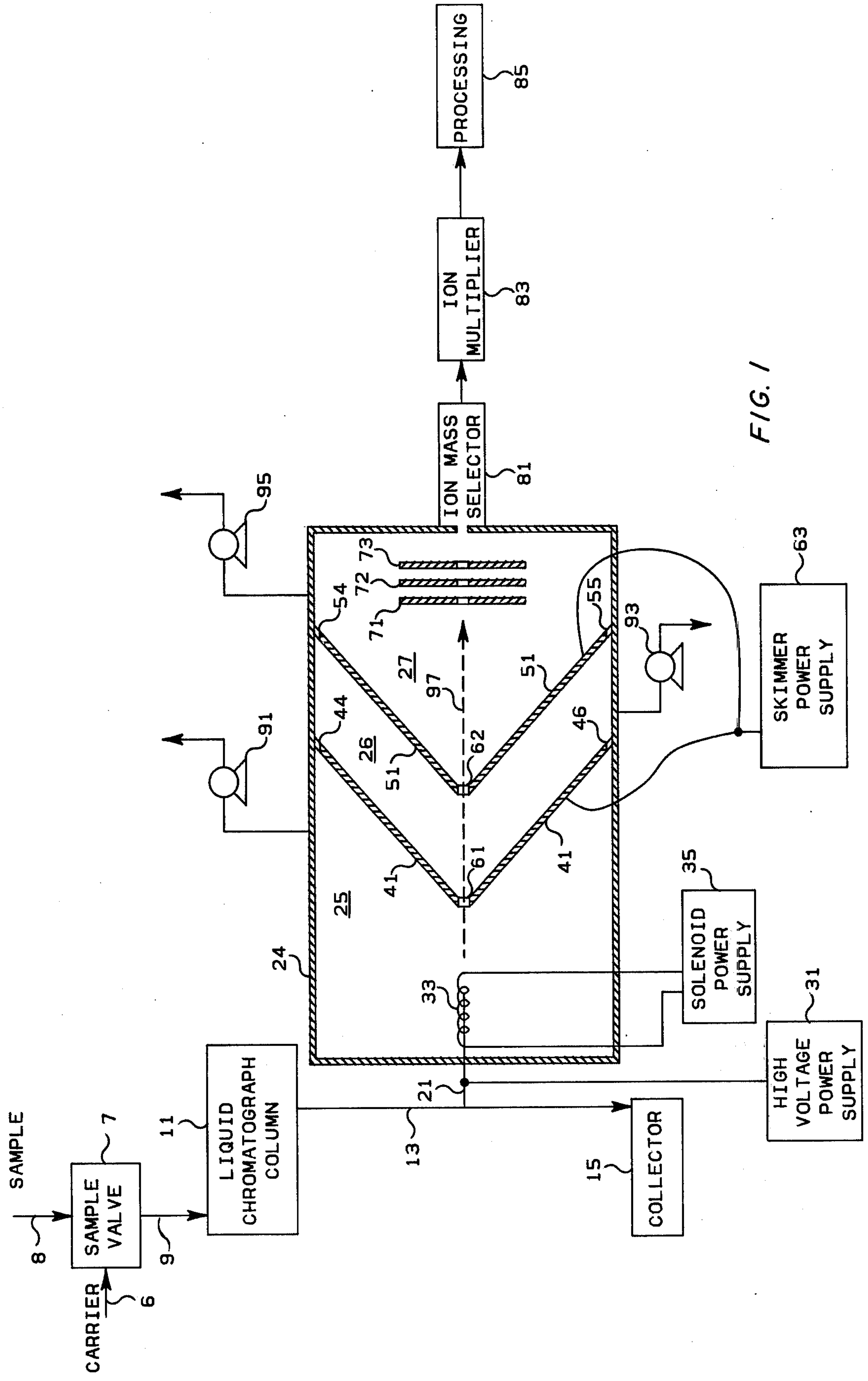

This invention relates to liquid chromatography. In one specific aspect, this invention relates to method and apparatus for using a mass spectrometer as a detector in a liquid chromatography system. In a second specific aspect, this invention relates to method and apparatus for interfacing a liquid chromatography system and a mass spectrometer.

As used herein, the term liquid chromatography refers to chromatographic systems wherein the separation is based on the differences in solubility and is carried out with a liquid substrate such as partition chromatography and also refers to chromatographic systems wherein the separation is based upon molecular size and is carried out with a liquid substrate such as gel permeation chromatography.

Liquid chromatography has become increasingly important for the separation and detection of polyfunctional and thermally sensitive compounds. In many cases, liquid chromatography applications have been limited only by the availability of suitable detection systems. The most common detector systems presently utilized in liquid chromatography are light absorption and fluorescence detectors. These detection systems are, however, far from universal in their application.

Mass spectrometry affords a more nearly universal detection system for liquid chromatography. However, significant problems have been experienced in the past in interfacing the liquid chromatograph system to the mass spectrometer. It is thus an object of this invention to provide method and apparatus for using a mass spectrometer as a detector in a liquid chromatography system. It is another object of this invention to provide method and apparatus for interfacing a liquid chromatography system and a mass spectrometer.

In accordance with the present invention, method and apparatus is provided whereby the effluent from a liquid chromatograph, which contains the solvent and solute, is injected into an ion chamber by means of a needle or orifice which penetrates into but is electrically insulated from the ion source vacuum chamber. The needle is held at a high voltage to provide a charge to the solute passing through the needle into the ion source.

The ion source, in a preferred embodiment, consists of three chambers which are differentially pumped and which are separated by skimmers which contain small pinholes. In this preferred embodiment the skimmers are insulated from the body of the ion source so that they may be held at a potential which will help draw and focus the ions through small holes in the center of the skimmers. The first chamber in the ion source is pumped to a pressure of approximately $10^{-3}$ atmospheres. This low pressure will pull solvent or solvent plus solute through the needle and spray it into the first chamber of the ion source. The droplets of spray carry a charge due to the high potential supplied by the needle as the effluent from the liquid chromatograph is sprayed into the ion source. The solvent will evaporate in the low pressure environment, thus reducing the size of the charged droplets until only a few molecules remain. Ultimately, only the ions will be left and these ions are focused and drawn through the pinholes in the center of each skimmer, through ion lenses, and thus into a mass spectrometer system. Preferably a solvent is chosen which is not as easily ionized as the solute being analyzed. Alternatively the polarity of the charge on the needle can be reversed, virtually guaranteeing that the solute will be more readily ionized than the solvent for some choice of solvent, solute, and charge polarity. Thus, the solute will often constitute the major portion of the ions supplied to the mass spectrometer.

In a preferred embodiment a solenoid is utilized to concentrate the ions and increase the extent to which the ions are separated from the effluent which was not ionized. Also, substantial signal-to-noise ratio enhancement may be achieved by modulating the potential at which the needle supplying the effluent to the ion source is held. By modulating the potential from zero voltage to maximum voltage, ions can be provided in pulses separated by hiatuses (an ion pulse when voltage is at a maximum, a hiatus when voltage is zero). Lock-in detection can then be utilized to filter out all noise except the small fraction of the noise which has a frequency component near the modulation rate.

A fine metering needle valve may be utilized to control the flow of effluent from the liquid chromatograph system through the needle into the first chamber of the ion source if control of the flow is a problem. Also, a laser or other suitable heat source may be utilized to prevent the effluent from freezing as it flows through the needle into the low pressure existing in the first chamber of the ion source and to provide heat to the effluent in the first chamber.

Figure 2:
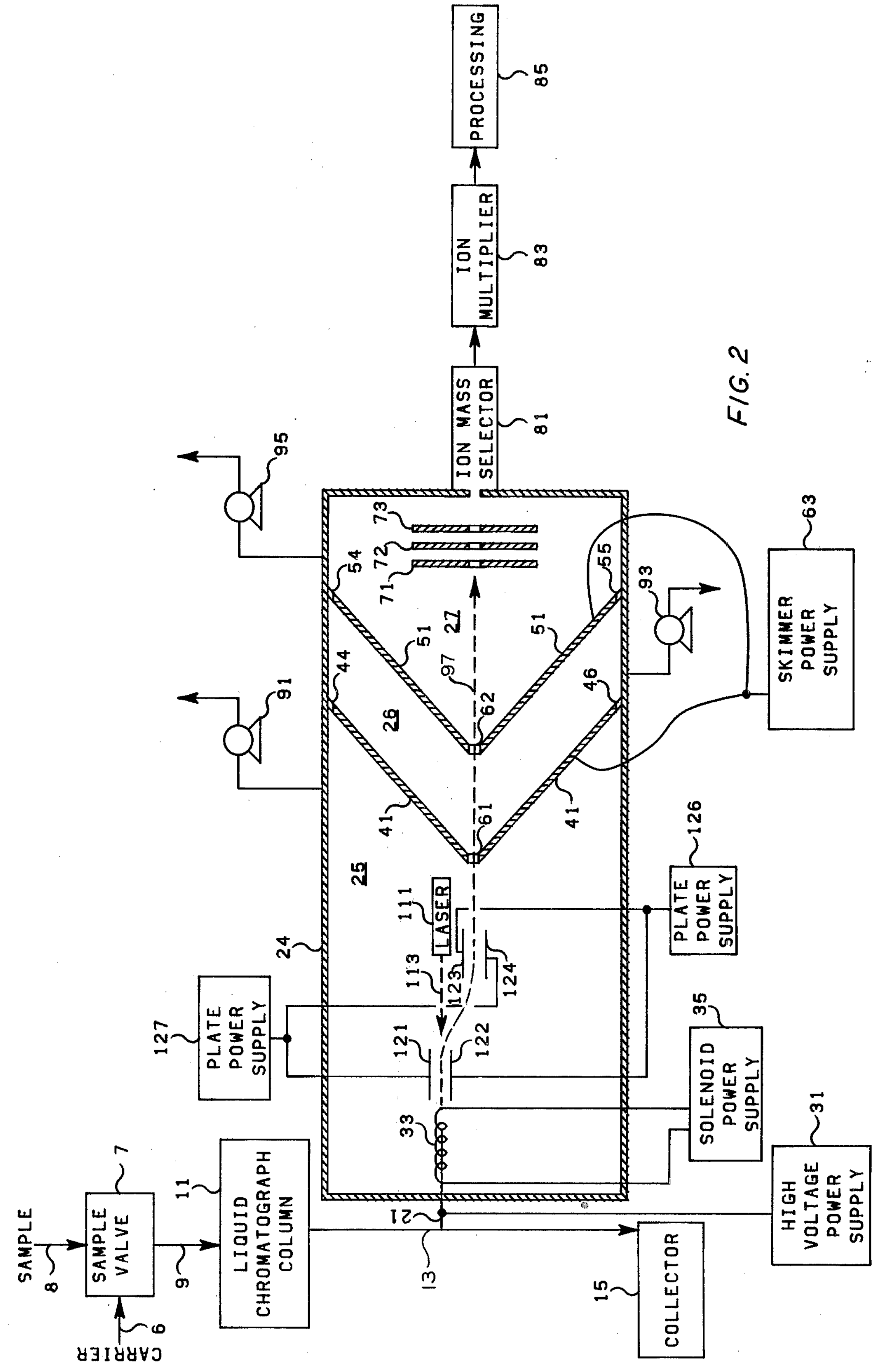
Figure 3:
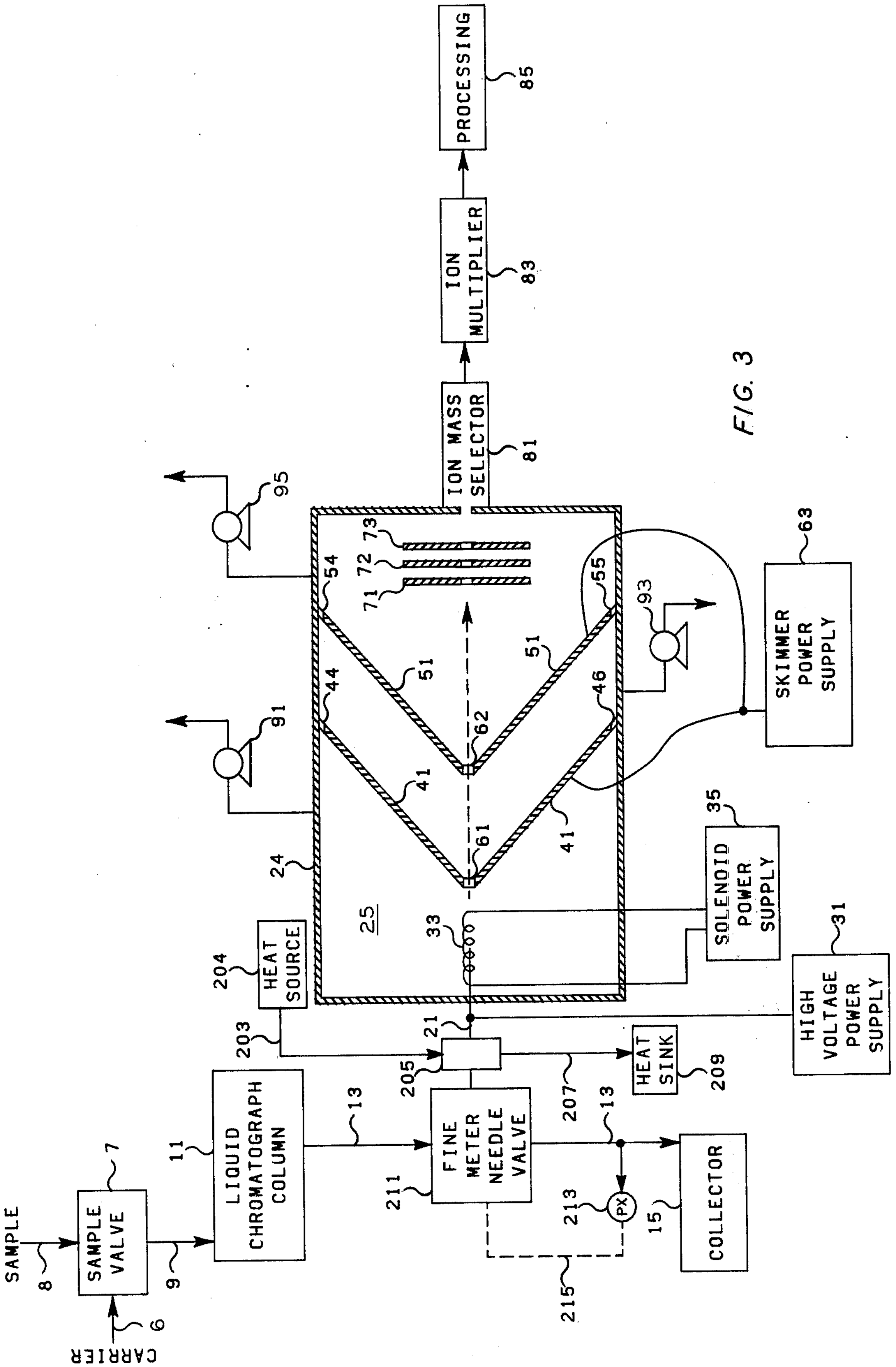

Other objects and advantages of the invention will be apparent from the detailed description of the invention and the appended claims as well as from the detailed description of the drawings in which:

FIG. 1 is an illustration of the interface between a liquid chromatograph system and a mass spectrometer;

FIG. 2 is an illustration of the interface between a liquid chromatograph system and a mass spectrometer as illustrated in FIG. 1 wherein a laser is utilized to prevent the effluent from freezing in the needle which connects the liquid chromatograph system to the first chamber of an ion source; and FIG. 3 is an illustration of the interface between the liquid chromatograph system and the mass spectrometer as illustrated in FIG. 1 with a means for heating the needle through which the effluent is flowing from the liquid chromatograph system into the first chamber of the ion source and with a fine metering needle valve utilized to control the flow of effluent through the needle.

The invention is described in terms of a preferred embodiment wherein a particular mechanical configuration for an ion source is utilized. The invention is, however, not limited to this particular mechanical configuration but is applicable to any mechanical configuration which could be utilized to provide an ion stream to a mass spectrometer. Alterations, such as using an ion source having only two chambers, are within the scope of the invention.

Referring now to the drawings, and in particular to FIG. 1, there is shown a liquid chromatograph column 11. A carrier fluid is introduced through conduit means 6 into sample means 7. A sample of a fluid to be analyzed is delivered to sample valve means 7 through conduit means 8. A conduit means 9 extends between sample valve means 7 and the inlet to the liquid chromatograph column 11. A conduit means 13 extends between the outlet of liquid chromatograph column 11 and the collection means 15.

At the beginning of an analysis period, sample valve means 7 is actuated to introduce a predetermined volume of sample into the carrier fluid flowing through liquid chromatograph column 11. The constituents of the sample are eluted in sequence and flow from liquid chromatograph column 11 through conduit means 13 to the collection means 15. The collection means is simply a disposal unit in the preferred embodiment of the invention. The conduit means 13 is electrically a nonconductor, and is preferably a Teflon tube. However the tube could be formed from any suitable material such as plastic, ceramic, or glass.

At some point along conduit means 13 it might be desirable to add a conventional detector means such as a light absorption, refraction, or fluorescence detector. This auxiliary detector means can be located either upstream or downstream of needle 21. In the preferred embodiment of this invention, such additional detector means is not included.

A needle 21 is connected to conduit means 13 and is also inserted into the first chamber 25 of the ion source 24. At least a part of the constituents of the sample flow from conduit means 13 into needle 21. The needle 21 may be formed from any material which conducts electricity. In a preferred embodiment, stainless steel is utilized to form needle 21. The needle 21 is held at a high potential by the high voltage power supply 31. The needle 21 is also wrapped at least partially by the solenoid coil 33. Power for the solenoid coil 33 is supplied by the solenoid power supply 35. The needle 21 is hermetically sealed to the ion source 24 but is electrically insulated from the ion source 24.

The ion source 24 contains three chambers 25, 26, and 27. The first chamber 25 is separated from the second chamber 26 by means of skimmer plate 41 which is frustoconical in shape and which has a pinhole 61 therein. In this preferred embodiment, the skimmer plate 41 is insulated from the ion source 24 by insulation means 44 and 46. The second chamber 26 is separated from the third chamber 27 by means of skimmer plate 51 which is also frustoconical in shape and which has a pinhole 62 therein. Skimmer plate 51 is also, in this preferred embodiment, electrically insulated from the ion source 24 by insulation means 54 and 55. Skimmer power supply 63 may be utilized to hold the skimmer plates 41 and 51 at a potential which will help draw and focus the ions through the pinholes 61 and 62.

The ion source 24 also contains ion lenses 71–73 which are utilized to further focus the ion beam and direct the ion beam into the ion mass selector 81.

The ion mass selector 81, the ion multiplier 83 and the processing unit 85 all constitute a mass spectrometer. Such mass spectrometers are well known in the art.

The chambers 25, 26 and 27 of the ion source 24 are differentially pumped. In this preferred embodiment the first chamber 25 is pumped to a pressure of approximately $10^{-3}$ atmospheres by pumping means 91. The second chamber 26 is pumped to a pressure in the range of about $10^{-4}$ to about $10^{-5}$ atmospheres by pumping means 93. The third chamber 27 is pumped to a pressure in the range of about $10^{-6}$ to about $10^{-7}$ atmospheres by pumping means 95. The pumping means 91, 93 and 95 may be any suitable pumping means known in the art, for example, diffusion pumps. The exact pressure to which the chambers 25, 26 and 27 are pumped depends on the sizes of pinholes 61 and 62 and also depends on the overall geometry of the ion source 24. The desired pressure in the first chamber may also depend on the desired flow rate of effluent through the needle 21 into the first chamber 25. The desired pressure in the third chamber 27 is often determined by the operating requirements of the mass spectrometer utilized as a detector in the present invention.

The operating characteristics of a liquid chromatograph system are well known. Essentially, a sample being analyzed will be divided into its constituent parts and these parts will be eluted at different times. At least a part of the eluted constituents and the solvent in which the eluted constituents are dissolved are sprayed into the first chamber 25 of the ion source 24 by means of needle 21 which is operatively connected to conduit means 13 and the first chamber 25 of ion source 24. The needle 21 is held at a high potential which may be either positive or negative to impart a charge to or ionize the effluent from the liquid chromatograph column 11 flowing through the needle 21. As the effluent containing the constituent of the sample being analyzed is sprayed into the first chamber 25 of the ion source 24, the majority of the solvent will be evaporated in the low pressure environment of the first chamber 25. The solvent is preferably not as easily ionized as the solute or constituents of the sample being analyzed. Thus, more of the ion stream 97 will be made up of ions of the solute than solute makes of the eluent in conduit means 13. The un-ionized portions of the solvent and solute are drawn off by pumping means 91 as the solvent evaporates. The solenoid coil 33 is utilized to further concentrate the ions and provide greater separation between the ions and the un-ionized portion of the effluent flowing through needle 21. Ultimately, the molecules, in the effluent flowing through the needle 21, having the least ionization potential where the needle 21 is held at a positive voltage or the greatest electron affinity where the needle 21 is held at a negative voltage, will be all that is left of the effluent which has been sprayed into the first chamber 25 of the ion source 24. The skimmers 41 and 51 are held at a potential suitable for focusing the ions in the first chamber 25 and drawing the ion stream 97 through the pinholes 61 and 62. The ion stream 97 is further focused by the ion lenses 71–76 and is provided to the ion mass selector 81. The mass spectrometer made up of the ion mass selector 81, the ion multiplier 83, and the processing unit 85 provides an output representative of the mass of the molecules in the ion stream 97.

Because of the fact that the ion beam 97 will consist more of ions from the molecules which have the least ionization potential or the greatest electron affinity, and a solvent can, in very many cases, be chosen which will not be so nearly readily ionized as the solute, the ionization source 24 can provide an interface means whereby a mass spectrometer can be used as a nearly universal detector for a liquid chromatograph system.

The preferred embodiment of the invention as illustrated in FIG. 1 offers several means by which substantial signal-to-noise ratio enhancement may be achieved. One such means is signal modulation and lock-in detection. Signal modulation of the ion beam 97 may be achieved by modulating the high voltage power supply 31 from zero to maximum voltage. In this manner, ions would be formed in pulses separated by hiatuses (an ion pulse when voltage is at maximum, a hiatus when voltage is near zero). Lock-in detection could then be utilized in the ion multiplier 83 which would filter out all noise except the small fraction of the noise which has a frequency component near the pulsing rate of the high voltage power supply 31. Other well known pulsing methods could be utilized which include a wheel, a tuning fork beam chopper, or an electrostatic or magnetic field to deflect or focus/defocus the ion beam 97.

In the preferred embodiment of the invention, as illustrated in FIG. 1, high pumping rates are utilized to achieve the desired pressures in the chambers 25, 26 and 27 of the ion source 24, and a high rate of evaporation is utilized to separate the solvent from the solute in the first chamber 25. A problem is often seen in maintaining an evaporation rate which will effectively separate the solvent and the solute. Also, problems are sometimes encountered with the effluent from the liquid chromatograph freezing as it flows through the needle 21 into the first chamber 25 of the ion source 24. FIG. 2 illustrates at least one possible solution to these problems.

Referring now to FIG. 2, the interface illustrated in FIG. 2 between the liquid chromatograph column 11 and the mass spectrometer made up of the ion mass selector 81, the ion multiplier 83, and the processing unit 85 is identical to the interface illustrated in FIG. 1 except for the addition of the laser 111 and the plates 121–124 and their associated plate power supplies 126 and 127. The laser 111 is utilized to provide heat to the needle 21 to prevent the effluent flowing through the needle from freezing and is also utilized to supply heat to the effluent being sprayed through needle 21 into the first chamber 25 of the ion source 24 to allow the solvent to be more easily evaporated from the solute. In this embodiment of the invention, the laser 111 is preferably a 2-watt helium-neon laser. The laser beam 113 is preferably directed to the opening of the needle 21 in the first chamber 25 of the ion source 24. Plates 121–124 are utilized to deflect the ion beam 97 to prevent interference with the laser 111. The plate power supply 127 supplies power to plates 121 and 124. The plate power supply 126 supplies power to plates 122 and 123. The plates 121 and 122 are held at differential voltages suitable for deflecting the ion beam 97 to the plates 123 and 124. The plates 123 and 124 are also held at voltages suitable for deflecting the ion beam 97 through the pinholes 61 and 62 and the ion lenses 71–73 to the ion mass selector 81. In this preferred embodiment the voltage seen by plate 122 is equal to the voltage seen by plate 123 and the voltage seen by plate 121 is equal to the voltage seen by plate 124. In this manner heat is supplied by means of laser 111 to the needle 21 and the effluent being sprayed from the needle 21 into the first chamber 25 of the ion source 24 and interference between the ion beam 97 and the laser 111 is prevented by the deflection plates 121–124.

FIG. 3 illustrates a second method and apparatus for preventing the freezing of the effluent from the liquid chromatograph column 11 flowing through the needle 21. The liquid chromatograph system, the ion source 24, and the mass spectrometer illustrated in FIG. 3 are identical to the similarly numbered parts illustrated in FIG. 1. In the embodiment of the invention illustrated in FIG. 3, a heat source 204 has been added which supplies heat through conduit means 203 to a jacket 205 which at least partially surrounds the needle 21. The heated medium flowing from heat source 201 through conduit means 203 is withdrawn from the jacket 205 through conduit means 207 to a heat sink 209. The heat sink 209 is simply a disposal unit in this embodiment of the invention. Alternatively heat sink 209 could be a pump for returning the working fluid to heat source 204. In this manner, heat is supplied to the needle 21 to prevent the effluent flowing through needle 21 from freezing and thus blocking the flow of ions through the ion source 24 to the mass spectrometer.

FIG. 3 also illustrates apparatus for regulating the flow of effluent through needle 21. A fine metering needle valve 211 located in conduit means 13 may be utilized to regulate the flow of effluent from conduit means 13 into and through needle 21 if control of the flow rate through needle 21 would be advantageous. A pressure transducer 213 is utilized to sense a rise in the pressure in conduit means 13 which would indicate that the needle 21 has become at least partially obstructed because of freezing or for some other reason. Signal 215, which is representative of the pressure in conduit means 13, is supplied from pressure transducer 213 to the fine metering needle valve 211 and is utilized to control the opening or closing of the fine metering needle valve 211. In this manner the flow of effluent from the liquid chromatograph 11 into the ion source 24 can be accurately controlled.

The invention has been described in terms of its presently preferred embodiment as is shown in FIG. 1 and in terms of alternative embodiments as illustrated in FIGS. 2 and 3. Suitable components for the practice of the invention as illustrated in FIGS. 1–3 have been described and are readily available from a number of suppliers.

Any part of any of the embodiments of the invention could be combined if desired. For instance the laser heating means of FIG. 2 could be used with the needle valve of FIG. 3 and still be within the scope of the invention.

While the invention has been described in terms of the presently preferred embodiment and alternatives thereof, reasonable variations and modifications are possible by those skilled in the art, within the scope of the described invention and the appended claims.

That which is claimed is:

1. In liquid chromatography wherein a mass spectrometer is utilized as a detector, an improved interface between a liquid chromatograph column and a mass spectrometer comprising:

an ion source having at least first and second chambers, said first chamber and said second chamber being divided by at least one skimmer plate, said at least one skimmer plate having a small hole therein;

first pumping means operatively connected to said first chamber;

second pumping means operatively connected to said second chamber;

a conduit means for supplying solvent and solute from said liquid chromatograph column to said first chamber of said ion source; means for applying a high voltage potential to said conduit means, said high voltage potential being sufficient to at least partially ionize said solute, said conduit means being sealed to but electrically insulated from said ion source;

means for passing the ionized portion of said solute through said small hole in said at least one skimmer plate into said second chamber of said ion source; and means for supplying said ionized portion of said solute from said ion source to said mass spectrometer to therein analyze said ionized portion of said solute.

2. Apparatus in accordance with claim 1 wherein said conduit means comprises a stainless steel needle.

3. Apparatus in accordance with claim 1 additionally comprising a solenoid, located at the outlet of said conduit means in said first chamber, to concentrate said ionized portion of said solute.

4. Apparatus in accordance with claim 1 wherein said first chamber is held at a higher pressure than said second chamber to facilitate the flow of said ionized portion of said solvent from said first chamber to said second chamber, and to reduce the pumping burden on said first pumping means.

5. Apparatus in accordance with claim 1 wherein said at least one skimmer plate is electrically insulated from said ion source and is charged to a voltage potential which will help focus and draw said ionized portion of said solute through said small hole in said at least one skimmer plate.

6. Apparatus in accordance with claim 1 additionally comprising:

means for modulating said means for applying a high voltage potential from a minimum voltage output to a maximum voltage output; and lock-in detection means associated with said mass spectrometer for detecting said ionized portion of said solute at the frequency of modulation of said means for applying a high voltage potential.

7. Apparatus in accordance with claim 1 additionally comprising:

a laser means for heating said solvent and solute in said first chamber.

8. Apparatus in accordance with claim 7 further comprising:

a first deflection means for deflecting said ionized portion of said solute out of the path of said laser;

a second deflection means for deflecting said ionized portion of said solute through the hole in said at least one skimmer plate, said ionized portion of said solute being deflected by said first deflection means to said second deflection means.

9. Apparatus in accordance with claim 1 additionally comprising means for supplying heat to said conduit means.

10. Apparatus in accordance with claim 1 additionally comprising a fine metering needle valve for controlling the flow of said solute and said solvent through said conduit means into said first chamber of said ion source.

11. Apparatus in accordance with claim 1 wherein said ion source comprises first, second and third chambers; said first chamber being divided from said second chamber by a first skimmer plate having a small hole therein, said second chamber being divided from said third chamber being divided by a second skimmer plate having a small hole therein.

12. Apparatus in accordance with claim 11 additionally comprising a third pumping means operatively connected to said third chamber of said ion source.

13. Apparatus in accordance with claim 12 wherein said third chamber of said ion source is operatively connected to said mass spectrometer.

14. Apparatus in accordance with claim 13 wherein said first chamber is held at a higher pressure than said second chamber to facilitate the flow of said ionized portion of said solute from said first chamber to said second chamber and to reduce the pumping burden on said first pumping means and wherein said second chamber is held at a higher pressure than said third chamber to facilitate the flow of said ionized portion of said solute from said second chamber to said third chamber and to reduce the pumping burden on said second pumping means.

15. Apparatus in accordance with claim 14 wherein said conduit means comprises a stainless steel needle.

16. Apparatus in accordance with claim 15 additionally comprising a solenoid, located at the outlet of said conduit means in said first chamber, to concentrate the ionized portion of said solute.

17. Apparatus in accordance with claim 16 wherein said first and second skimmer plates are electrically isolated from said ion source and are charged to a voltage potential which will help focus and draw said ionized portion of said solute through the small hole in said first skimmer plate and the small hole in said second skimmer plate.

18. Apparatus in accordance with claim 17 wherein a high voltage power supply is utilized to hold said conduit means at a high voltage potential.

19. Apparatus in accordance with claim 18 additionally comprising:

means for modulating said high voltage power supply from a minimum voltage output to a maximum voltage output; and lock-in detection means associated with said mass spectrometer for detecting said ionized portion of said solute at the frequency of modulation of said high voltage power supply.

20. Apparatus in accordance with claim 19 additionally comprising:

a laser means for heating said solvent and solute in said first chamber;

a first deflection means for deflecting said ionized portion of said solute out of the path of said laser;

a second deflection means for deflecting said ionized portion of said solute through the hole in said first skimmer plate, said ionized portion of said solute being deflected by said first deflection means to said second deflection means.

21. Apparatus in accordance with claim 20 additionally comprising means for supplying heat to the portion of said conduit means which is outside said ion source.

22. Apparatus in accordance with claim 21 additionally comprising a fine metering needle valve for controlling the flow of said solute and said solvent through said conduit means into said first chamber of said ion source.

23. In liquid chromatography wherein a mass spectrometer is utilized as a detector, an improved method of interfacing the liquid chromatograph column and a mass spectrometer comprising the steps of:

maintaining a first pressure in the first chamber of an ion source;

maintaining a second pressure, lower than said first pressure, in the second chamber of said ion source;

supplying solvent and solute from said liquid chromatograph column to said first chamber of said ion source through a conduit means; applying to said conduit means a high voltage potential sufficient to ionize at least a portion of said solute;

evaporating at least a portion of said solvent and at least a portion of any un-ionized solute in said first chamber of said ion source;

supplying the ionized portion of said solute and any unevaporated portion of said solvent and any unevaporated portion of said un-ionized solute from said first chamber to said second chamber;

evaporating substantially all of said unevaporated portion of said solvent and said unevaporated un-ionized solute in said second chamber; and supplying said ionized portion of said solute from said second chamber of said ion source to said mass spectrometer to therein analyze said ionized portion of said solute.

24. A method in accordance with claim 23 comprising the additional step of utilizing a magnetic field to concentrate said ionized portion of said solute in said first chamber of said ion source.

25. A method in accordance with claim 24 wherein the difference in pressure between said second chamber and said first chamber facilitates supplying said ionized portion of said solute and any unevaporated portion of said solvent and any unevaporated portion of said un-ionized solute from said first chamber to said second chamber, and reduces the pumping speed requirements for the pump connected to said first chamber.

26. A method in accordance with claim 23 wherein said first chamber is separated from said second chamber by at least one skimmer plate, said skimmer plate having a small hole therein.

27. A method in accordance with claim 26 comprising the additional steps of:

electrically insulating said at least one skimmer plate from said ion source; and holding said at least one skimmer plate at a voltage potential suitable for drawing said ionized portion of said solute through said small hole in said at least one skimmer plate.

28. A method in accordance with claim 23 comprising the additional steps of:

modulating the high voltage potential applied to said conduit means; and detecting said ionized portion of said solute at the frequency of modulation of said high voltage potential.

29. A method in accordance with claim 23 additionally comprising supplying heat to said solute and said solvent in said first chamber to increase the portion of said solvent which is evaporated in said first chamber.

30. A method in accordance with claim 23 additionally comprising heating said conduit means to prevent freezing of said solvent and said solute in said conduit means.

31. A method in accordance with claim 23 additionally comprising controlling the flow of said solvent and said solute in said conduit means.

32. In liquid chromatography wherein a mass spectrometer is utilized as a detector, an improved method of interfacing the liquid chromatograph column and a mass spectrometer comprising the steps of:

maintaining a first pressure in the first chamber of an ion source;

maintaining a second pressure, lower than said first pressure, in the second chamber of said ion source;

maintaining a third pressure, lower than said second pressure, in the third chamber of said ion source;

supplying solvent and solute from said liquid chromatograph column to said first chamber of said ion source through a conduit means;

applying to said conduit means a high voltage potential sufficient to ionize at least a portion of said solute;

evaporating at least a portion of said solvent and at least a portion of any un-ionized solute in said first chamber of said ion source;

supplying the ionized portion of said solute and any unevaporated portion of said solvent and any unevaporated portion of said unionized solute from said first chamber to said second chamber;

evaporating at least a portion of said unevaporated portion of said solvent and at least a portion of said unevaporated portion of said un-ionized solute in said second chamber of said ion source;

supplying the ionized portion of said solute and any unevaporated portion of said solvent and any unevaporated portion of said un-ionized solute from said second chamber to said third chamber;

evaporating substantially all of said unevaporated portion of said solvent and said unevaporated un-ionized solute in said third chamber; and supplying said ionized portion of said solute from said third chamber of said ion source to said mass spectrometer to therein analyze said ionized portion of said solute.

33. A method in accordance with claim 32 comprising the additional step of utilizing a magnetic field to concentrate said ionized portion of said solute in said first chamber of said ion source.

34. A method in accordance with claim 33 wherein the difference in pressure between said second chamber and said first chamber facilitates supplying said ionized portion of said solute and any unevaporated portion of said solvent and any unevaporated portion of said un-ionized solute from said first chamber to said second chamber and reduces the pumping speed required of the pump connected to said first chamber, and wherein the difference in pressure between said third chamber and said second chamber facilitates supplying said ionized portion of said solute and any unevaporated portion of said solvent and any unevaporated portion of said un-ionized solute from said second chamber to said third chamber, and reduces the pumping speed required of the pump connected to said second chamber.

35. A method in accordance with claim 32 wherein said first chamber is separated from said second chamber by a first skimmer plate and said second chamber is separated from said third chamber by a second skimmer plate, said first skimmer plate and said second skimmer plate having a small hole therein.

36. A method in accordance with claim 35 comprising the additional steps of:

electrically insulating said first skimmer plate from said ion source;

holding said first skimmer plate at a voltage potential suitable for drawing said ionized portion of said solute through said small hole in said first skimmer plate;

electrically insulating said second skimmer plate from said ion source; and holding said second skimmer plate at a voltage potential suitable for drawing said ionized portion of said solute through said small hole in said second skimmer plate.

37. A method in accordance with claim 32 comprising the additional steps of:

modulating the high voltage potential applied to said conduit means is held; and detecting said ionized portion of said solute at the frequency of modulation of said high voltage potential.

38. A method in accordance with claim 32 additionally comprising supplying heat to said solute and said solvent in said first chamber to increase the portion of said solvent which is evaporated in said first chamber.

39. A method in accordance with claim 32 additionally comprising heating said conduit means to prevent freezing of said solvent and said solute in said conduit means.

40. A method in accordance with claim 32 additionally comprising controlling the flow of said solvent and said solute in said conduit means.

* * * * *